UNITED STATES PATENT OFFICE.

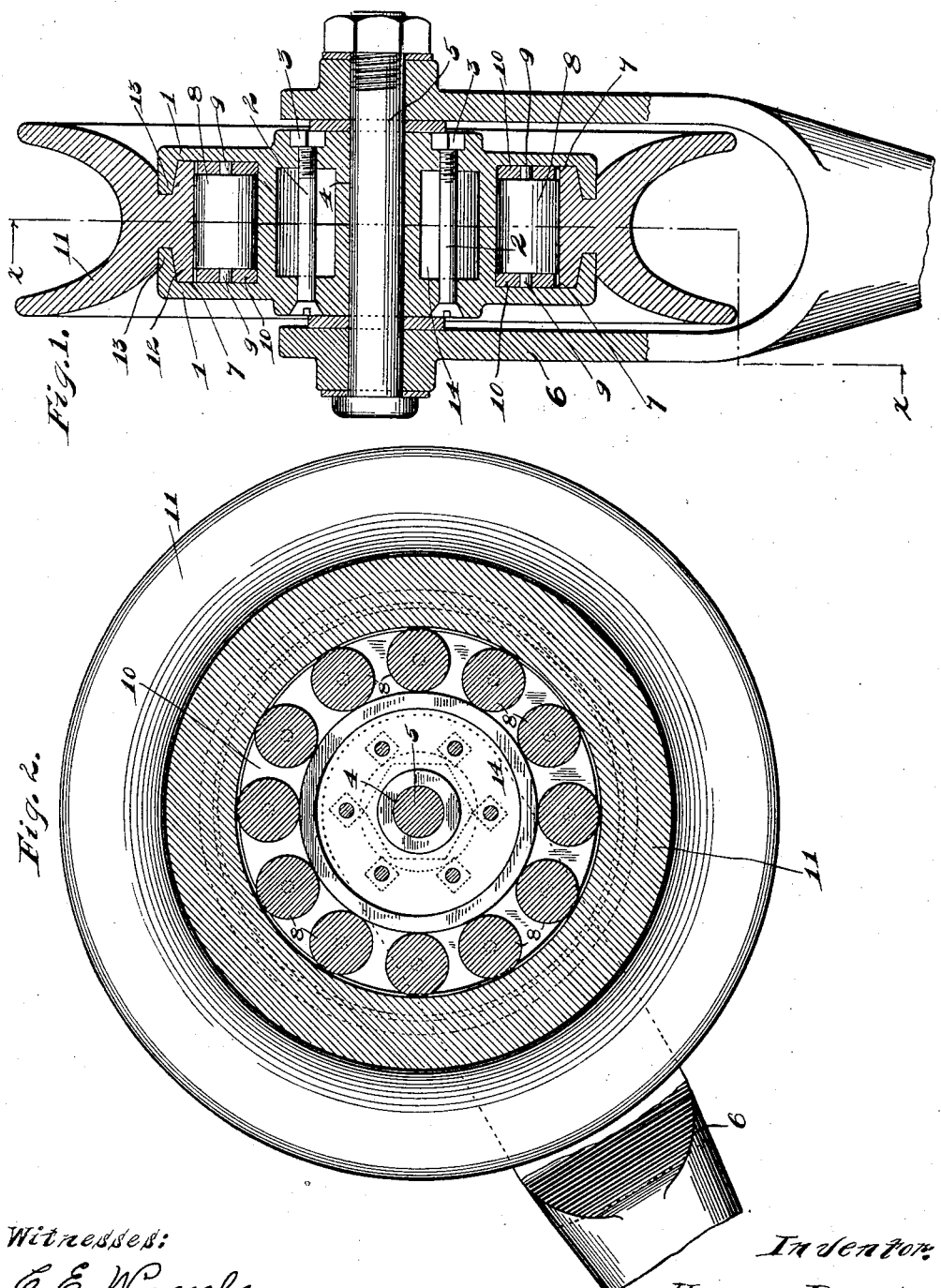

HENRY PRACK, OF OTTAWA, ILLINOIS.

TROLLEY-WHEEL.

1,033,344.  Specification of Letters Patent.  Patented July 23, 1912.

Application filed July 3, 1911. Serial No. 636,607.

*To all whom it may concern:*

Be it known that I, HENRY PRACK, a citizen of the United States, and a resident of the city of Ottawa, county of Lasalle, and State of Illinois, have invented certain new and useful Improvements in Trolley-Wheels, of which the following is a specification.

My invention relates to improvements in trolley wheels and has for its object the production of a device of this character which shall be of improved construction and efficient in operation.

A further object is the production of a trolley wheel which shall be so constructed that effectual lubrication thereof may be readily afforded.

Other objects will appear hereinafter.

With these objects in view my invention consists in a trolley wheel characterized as above mentioned and in certain details of construction and arrangements of parts all as will be hereinafter described and claimed.

My invention will be best understood by reference to the accompanying drawing forming a part of this specification, and in which, Figure 1 is a central section of a trolley wheel embodying my invention, and Fig. 2 is a section taken on line *x—x* of Fig. 1.

The preferred form of my construction as illustrated in the drawing comprises a central stationary member which consists of two similar circular members 1 which are rigidly secured together at intervals by means of screws or bolts 2 and nuts 3, the heads of the former and the latter being preferably countersunk in the sides of said member 1 as clearly shown in Fig. 1. Formed centrally through the members 1 is an opening 4 which accommodates the pin or bolt 5 through the medium of which the trolley wheel is secured in position upon the usual harp 6.

Formed in the periphery of the central member is a circumferential groove 7 at the base of which is arranged a plurality of spaced rollers 8, the gudgeons 9 of said rollers being rotatably mounted in annular bearing members 10 arranged in the groove 7 at the opposite sides thereof. Encircling the central member is the channel formed peripheral member 11 which is designed for contact with the conductor wire as will be readily understood. The base 12 of the member 11 is rotatably mounted in the groove 7 upon the rollers 8, inwardly extending flanges 13 provided at the peripheries of the members 1 engaging over the respective edges of the base 12, the inner edge portions of said flanges engaging annular grooves provided as shown in the sides of the member 11, serving to securely retain said member 11 in position. The construction is such as will be observed that the peripheral member 11 is mounted for free rotary movement in the member 1, the rollers 8 alleviating friction and thereby conducing to the freedom of movement of said peripheral member.

Formed concentrically in the central member intermediate the groove 7 and the opening 4 is an annular chamber 14 adapted for the reception of a lubricant, grease or other semi-fluid lubricant being preferably employed. In use, the chamber 14, as well as the interstices between the rollers 8 are filled with the lubricant before the members 1 are assembled. Such provision evidently conduces to the free running of the peripheral member 11, said grease oozing through the joint between the members 1 from the chamber 14 and from the interstices between the rollers 8 effecting the efficient lubrication of the contacting surfaces of said members 1 and 11. The construction is such that in the event of the member 11 becoming worn or otherwise disabled the same may be readily and easily removed and a new one arranged in its place. A trolley wheel of the construction set forth may be economically manufactured and the same is of high efficiency in operation.

While I have illustrated and described the preferred form for carrying my invention into effect, this is capable of variation and modification without departing from the spirit of my invention. I, therefore, do not wish to be limited to the exact details of construction as set forth, but desire to avail myself of such variations and modifications as come within the scope of the appended claims.

Having described my invention what I claim as new and desire to secure by Letters Patent is:

1. A trolley wheel comprising a circular central member having a circumferential groove in its periphery; bearing rollers mounted in said groove; and an annular channeled peripheral member formed for engagement with the conductor wire, the base of said annular member being rotatably mounted in said groove with its inner surface bearing directly upon said rollers, there being flanges provided at the sides of said groove engaging over the respective edges of the base of said peripheral member for retaining the latter in position, substantially as described.

2. A trolley wheel comprising a circular central member having a circumferential groove in its periphery and an internal annular concentric lubricant chamber; bearing rollers mounted in said groove; and an annular channeled peripheral member formed for engagement with the conductor wire, the base of said peripheral member being rotatably mounted in said groove with its inner surface bearing directly upon said rollers, substantially as described.

3. A trolley wheel comprising a circular central member consisting of two similar parts rigidly secured together, there being a circular groove formed at the periphery of said central member and an internal concentric annular lubricant chamber formed between said parts; bearing rollers mounted between said parts and in said groove; and an annular channeled peripheral member formed for engagement with the conductor wire rotatably mounted in said groove and having a cylindrical inner surface bearing directly upon said rollers, there being inwardly extending flanges at the sides of said groove engaging over the base of said peripheral member for retaining the latter in position, substantially as described.

4. A trolley wheel comprising a circular central member consisting of two similar parts rigidly secured together, there being a circular groove formed at the periphery of said central member and an internal concentric annular lubricant chamber formed between said parts, egress from said lubricant chamber outwardly being permitted through the joint between said parts of said central member; bearing rollers mounted between said parts and in said groove; and an annular channeled peripheral member formed for engagement with the conductor wire rotatably mounted in said groove and having a cylindrical inner surface bearing directly upon said rollers, there being inwardly extending annular flanges at the sides of said groove engaging over the base of said peripheral member, and the inner edge portions of said flanges engaging annular grooves in the sides of said peripheral member, substantially as described.

In testimony whereof I have signed my name to this specification in the presence of two subscribing witnesses.

HENRY PRACK.

Witnesses:
ARTHUR A. OLSON,
JOSHUA R. H. POTTS.

---

Copies of this patent may be obtained for five cents each, by addressing the "Commissioner of Patents. Washington, D. C."